United States Patent [19]

Taub et al.

[11] 4,306,243

[45] Dec. 15, 1981

[54] INK JET HEAD STRUCTURE

[75] Inventors: Howard H. Taub, San Jose; Peter H. Wolf, Mission Viejo, both of Calif.

[73] Assignee: DataProducts Corporation, Woodland Hills, Calif.

[21] Appl. No.: 77,858

[22] Filed: Sep. 21, 1979

[51] Int. Cl.[3] .............. G01D 15/18

[52] U.S. Cl. .............. 346/75; 310/328; 346/140 R

[58] Field of Search .............. 346/75, 140 R; 310/328; 417/322; 400/126

[56] References Cited

U.S. PATENT DOCUMENTS

| | | | |
|---|---|---|---|
| 3,298,030 | 1/1967 | Lewis | 346/75 |
| 3,397,278 | 8/1968 | Pomerantz | 357/40 |
| 3,708,118 | 1/1973 | Keur | 346/75 X |
| 3,831,727 | 8/1974 | Kruspe | 346/75 X |
| 3,958,249 | 5/1976 | DeMaine | 346/75 X |
| 4,007,464 | 2/1977 | Bassous | 346/75 |
| 4,069,433 | 1/1978 | McShane | 310/328 X |
| 4,097,872 | 6/1978 | Giordano | 346/75 |

OTHER PUBLICATIONS

Meier, J. H., Ink Jet Head, IBM Tech. Disc. Bulletin, vol. 16, No. 6, Nov. 1973, p. 1833.

*Primary Examiner*—Joseph W. Hartary
*Attorney, Agent, or Firm*—Spensley, Horn, Jubas & Lubitz

[57] ABSTRACT

An improved ink jet print head structure. The print head includes a cylindrical glass rod having a bore extending along the axis of the rod. A surface is ground on the rod parallel to and near the bore. A metal organic paste is fired on the surface and a piezoelectric driver plate is soldered to the paste. A silicon nozzle plate is bonded to the front of the rod by means of an anodic bonding technique. The head structure may be attached to a charging electrode by means of an insulating support member, resulting in a prealigned and easily replaceable unit. Several alternative embodiments of the head structure and means for attaching the structure to an input line are disclosed.

16 Claims, 9 Drawing Figures

FIG. 1
PRIOR ART
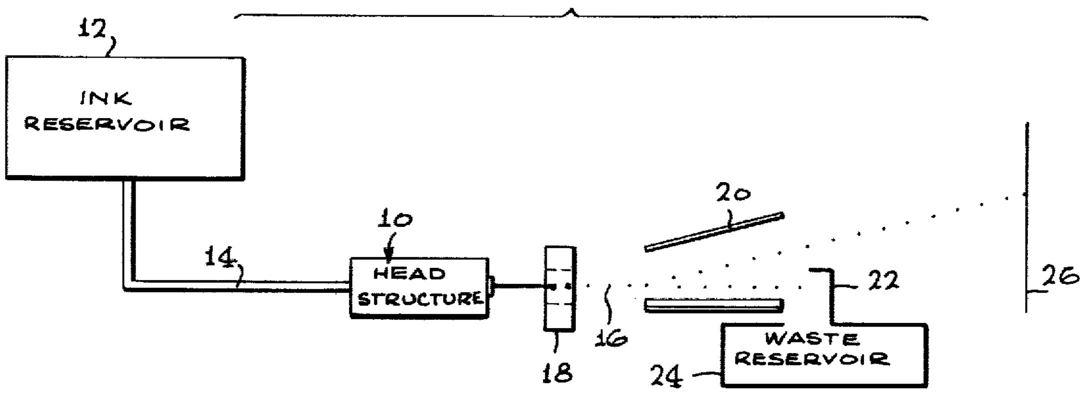
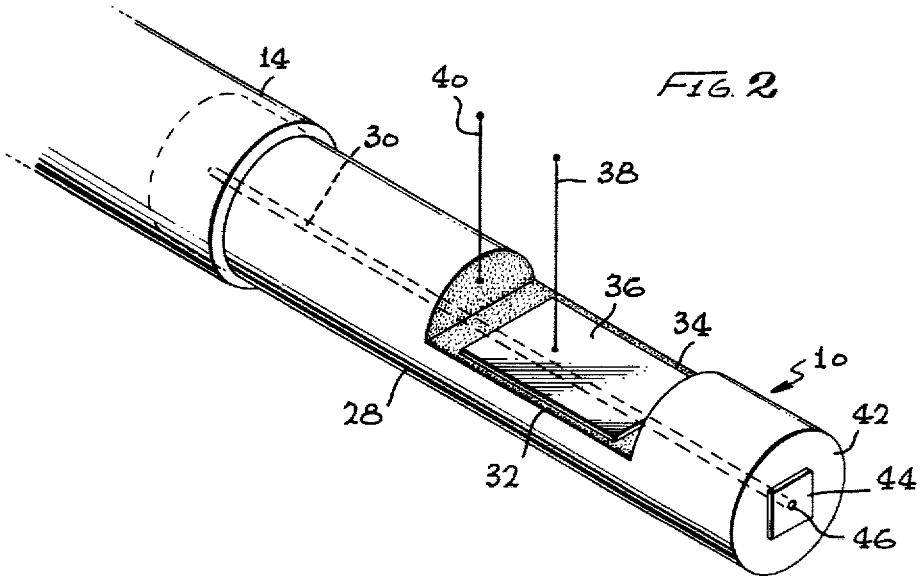
FIG. 2
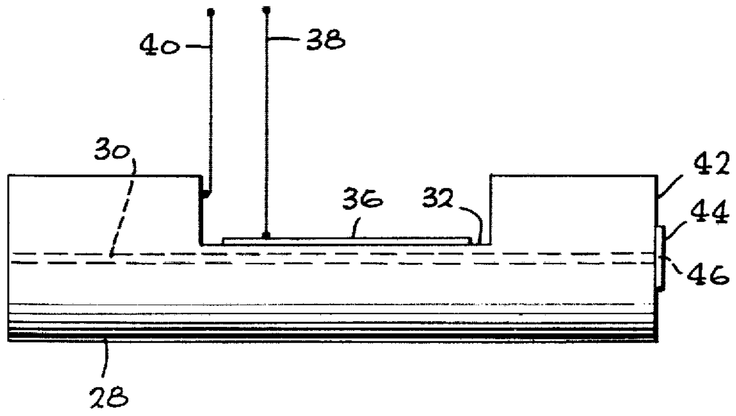
FIG. 3

FIG. 4
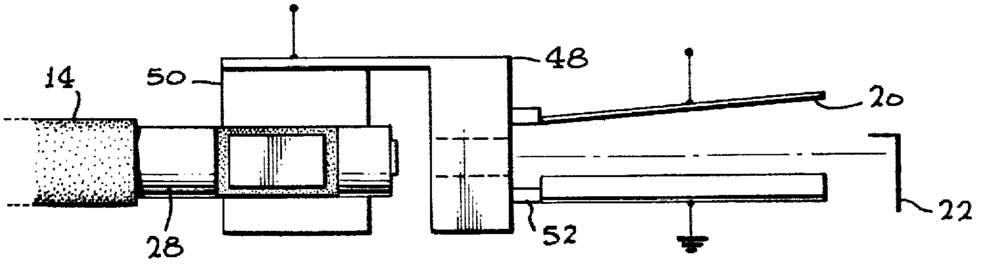
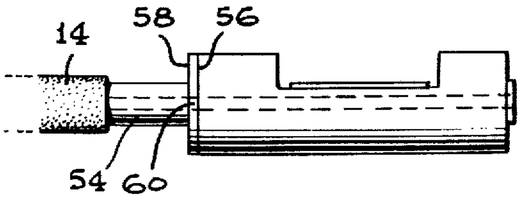
FIG. 5
FIG. 6
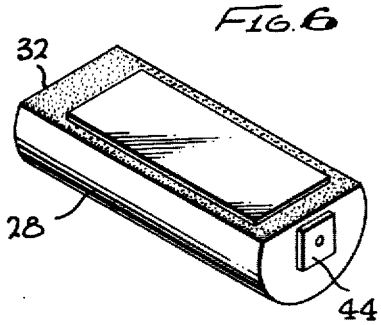
FIG. 7
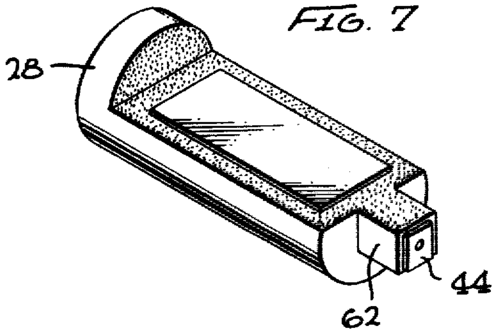
FIG. 8
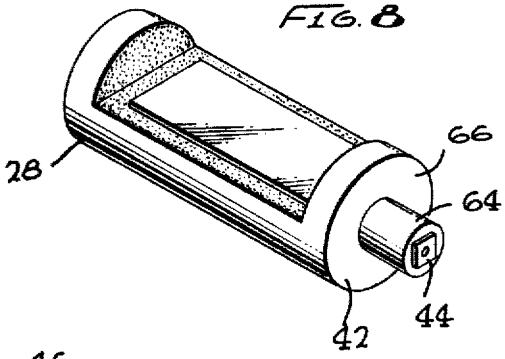
FIG. 9
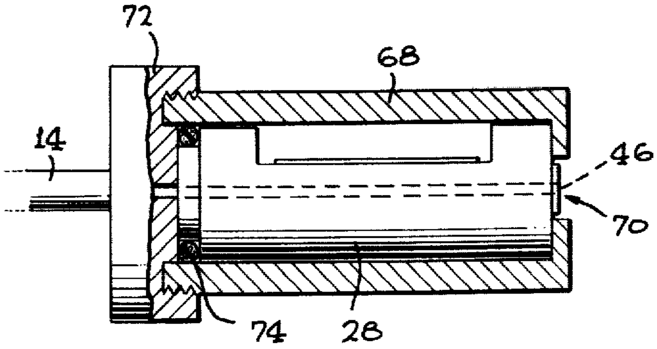

INK JET HEAD STRUCTURE

BACKGROUND OF THE INVENTION

1. Field of the Invention

This invention relates to an improved ink jet head structure for use in ink jet printers.

Generally, an ink jet printing system comprises a head structure which is coupled to a reservoir of ink so that ink under pressure is discharged in a stream from the head structure. The head structure is either vibrated or periodically constricted so that a short distance from an opening in the head structure the ink stream breaks up and forms drops. A charging electrode surrounds the point of drop formation, and a succession of voltages are applied to the electrode to charge each drop to a predetermined level by applying a voltage signal just prior to drop detachment and terminating it just after. The drops then pass between a pair of deflection plates to which a fixed potential is applied. As the drops pass between the deflection plates, they are deflected from a straight line path by an amount determined by the amplitude of the charge placed upon each drop by the charging electrode. The drops are then either directed by a gutter into a waste reservoir or continue on and strike a print surface.

2. Description of the Prior Art

It is known in the art to form the head structure from a glass tube or similar material. Examples of such head structures are disclosed in U.S. Pat. Nos. 3,683,396 to Keur, et al., 3,929,071 to Cialone, et al. and 3,972,474 to Keur. In each of the above patents, a cylindrical piezoelectric driver element is utilized. Such a cylindrical element is relatively difficult to produce and therefore increases the cost of the head structure.

Many systems do in fact use a flat piezoelectric driver unit. Examples of such systems may be found in U.S. Pat. Nos. 3,946,398 to Kyser, et al., 4,074,284 to Dexter, et al. and 4,007,464 to Bassous, et al. However, these systems do not employ a tubular structure and are relatively complex.

In addition to the design of the head structure itself, a separate nozzle plate is usually required in order to insure an accurate orifice, and thereby accurately control drop size. Bonding of the nozzle plate to the head structure in the past has been done either by using an intermediate bonding agent or by use of a mechanical coupling.

SUMMARY OF THE INVENTION

The present invention is directed to an improved ink jet head structure. The structure is greatly simplified when compared to the prior art devices. Due to the simplicity, the head structure can be designed as a throw away item. This is very advantageous due to the fact that nozzles employed in ink jet head structures are very prone to clogging.

The ink jet head structure includes a relatively short cylindrical glass rod with a small bore along its longitudinal axis. A surface parallel to longitudinal axis of the bore is formed in the glass rod a short distance from the periphery of the bore. A piezoelectric driver element is bonded to the surface and when energized causes the bore to constrict or flex, thus causing individual ink drops to be formed.

In order to accurately control the size of the ink drops, a nozzle plate is bonded to the front of the rod and concentric with the bore. The nozzle plate, which is preferably silicon, is bonded to the rod by means of an anodic bonding technique. This eliminates the need for any type of bonding agent or mechanical coupling.

BRIEF DESCRIPTION OF THE DRAWINGS

In the drawings:

FIG. 1 is a schematic diagram of a typical ink jet printing system;

FIG. 2 is a perspective view of the ink jet head structure of the present invention;

FIG. 3 is a side view of the ink jet head structure of the present invention;

FIG. 4 shows an ink jet head structure with an integrally mounted changing electrode;

FIG. 5 shows one alternate embodiment of the structure of FIG. 2;

FIG. 6 shows a second alternate embodiment of the structure of FIG. 2;

FIG. 7 shows a third alternate embodiment of the structure of FIG. 2;

FIG. 8 shows a fourth alternate embodiment of the structure of FIG. 2; and FIG. 9 shows an O-ring coupling device for use with the structure of FIG. 2.

DETAILED DESCRIPTION OF THE DRAWINGS

Referring to FIG. 1, a typical ink jet printing system is shown. Ink under pressure is delivered to a nozzle or head structure 10 from an ink reservoir 12 via an input line 14. The head structure 10 is periodically constricted so that an ink stream discharged from it breaks up into a plurality of individual drops 16 which are uniform in size and spacing as it passes through a charging electrode 18. The charging electrode 18 applies a charge to each of the drops. The magnitude of the charge placed on individual drops by the charging electrode 18 is variable and determines the drops' ultimate paths. After the drops have exited the charging electrode 18, they pass between a pair of deflection plates 20, to which a fixed potential is applied. As the drops pass between the deflection plates 20, they are deflected from a straight line path by an amount determined by the amplitude of the charge placed upon them by the charging electrode 18. Drops which are utilized for printing are deflected to a print surface 26 to form characters while excess drops are directed to a gutter 22 which in turn directs the drops to a waste reservoir 24. Ink in the reservoir 24 may then be recycled to the supply reservoir 12.

The present invention is directed to improvements in the head structure 10 of the printing system of FIG. 1. Referring to FIG. 2, the new head structure includes a cylindrical glass rod or tube 28 which has a small bore 30 extending along the longitudinal axis of the rod 28. A flat surface 32 is formed upon the rod 28 by grinding a groove into it. As may be seen more clearly in FIG. 3, the surface 32 is parallel to the longitudinal axis of and relatively close to the bore 30. A layer of fired on metal-organic paste 34, such as a silver paste, covers the flat surface 32 to form an electrical contact. A flat piezoelectric crystal driver plate 36 is electrically connected and fixed to the layer 34 by soldering. The layer 34 may extend up along a vertical wall 35 to facilitate electrical connection thereto. The plate 36 is driven via a conductor (e.g., wire) 38 and a ground conductor 40. When a periodic voltage is applied to the piezoelectric plate 36, it will flex, thereby causing the bore 30 to constrict (and expand). The periodic constriction causes the ink stream to break up into individual droplets shortly after it leaves the head structure. The driving force is most efficiently transmitted to the ink by forming the surface 32 relatively close to the bore 30. Typically the surface 32 is 0.03 to 0.1 inches from the periphery of the bore 30.

In order to accurately control the size of droplets which are formed, a nozzle plate 44 which includes an orifice 46 is bonded to the front surface 42 of the rod 28. The diameter of the orifice 46 can be more accurately controlled than that of the bore 30. The end 42 of the rod 28 is highly polished (generally to within two microinches of flatness) so as to enable the nozzle plate to be bonded to it by means of a technique known as anodic bonding. One form of such a process is fully described in U.S. Pat. No. 3,397,278, issued to Pomerantz on Aug. 13, 1968, the disclosure of which is herein incorporated by reference. Basically, this technique is useful in bonding an electrically conductive element to an insulator element. The elements to be bonded are placed in an abutting relationship and the insulator element is heated to a temperature sufficient to render it slightly electrically conductive by virtue of the increased mobility of impurity ions. An electric potential is then applied across the elements to pass an electric current through their points of contact and create an electrostatic field between the adjoining surfaces. The application of the electric potential causes a bond to be formed at the interface of the elements. In order to reduce the possibility of separation of the elements on cooling, they should be chosen so that their thermal coefficients match very closely. In the present embodiment of the invention, the nozzle plate 44 is silicon and the rod 28 is made of borosilicate glass such as obtainable from Corning Glassworks under the trademark "Pyrex" (number 7740). The invention is not limited to the specific materials, however, and many other suitable materials are described in the Pomerantz patent. In general terms, the process is applicable to the bonding of an inorganic insulator element of normally high electrical resistivity to a metallic element. For purposes of this application, the term "anodic bonding" shall mean that process disclosed in the Pomerantz patent.

Referring now to FIG. 4, a charging electrode 48, corresponding to the charging electrode 18 of FIG. 1, may be attached directly to the rod 28 by means of an insulating support 50. In addition, the deflection plates 20 can also be secured to the charging electrode 48 by means of a bracket 52, resulting in a unitary structure in which all the components are accurately aligned. This facilitates easy replacement of the head structure without requiring realignment of the system.

As shown in FIGS. 2 and 4, the input tube 14 is coupled to the rod 28 simply by fitting it over the outside surface of the end of the rod 28. A smaller input line may be easily accommodated by bonding a smaller glass tube 54 to the rod 28, as shown in FIG. 5. This is done by initially depositing a thin metal film 58 such as aluminum to the rear surface 56 of the rod 28 by the evaporation or sputtering techniques. The tube 54 is then in turn anodically bonded to the metal film 58. The film 58 includes an aperture 60 to allow the passage of ink from the tube 54 to the bore 30 of the rod 28. Alternatively, the metal layer 58 could be a metal screen which would serve as a final filter for the ink.

Referring now to FIGS. 6, 7, and 8, alternate embodiments of ink jet head structure are shown. As shown in FIG. 6, the flat surface 32 need not be formed as a groove, but may extend the entire length of the rod 28. This may simplify the grinding process. The rod 28 may also be ground so that it includes a protruding section 62 to which the nozzle plate 44 is bonded, as shown in FIG. 7. Alternatively, a protrusion may be employed by attaching a smaller tube section 64 to the front of the rod 28 by the anodic bonding technique. In such a case, a metallic layer 66 would initially have to be bonded to the front surface 42 of the rod 28.

Referring now to FIG. 9, the coupling of the input line 14 to the rod 28 may be simplified by employing an O-ring compression fitting. The fitting includes a cylindrical sleeve 68 which surrounds the front and sides of the rod 28 and includes an aperture 70 which exposes the orifice 46. A screw on fitting 72, to which is attached the input line 14, is secured to the rear of the sleeve 68. An O-ring 74 is positioned within the sleeve 68 between the rear of the rod 28 and the fitting 72. When the fitting 72 is tightened, the O-ring 74 forces the rod 28 towards the front of the sleeve 68. The O-ring 74 is compressed, resulting in a tight seal and effectively coupling the input line 14 to the bore 30 of the rod 28.

In summary, the present invention is directed to a simplified ink jet head structure. The structure comprises a glass rod or tube having a surface ground into it to which a flat piezoelectric driver is bonded. The bonding is simplified by making the surface flat and using a flat piezoelectric driver. A curved surface and driver could be utilized, however and would provide further control over the construction of the bore 30. In such a case the mounting of the driver will not be any more difficult as long as its surface does not encompass more than a semicircle. By utilizing a thick film metal organic paste, the driver may be directly soldered to the structure. The technique of anodic bonding can be used to directly bond silicon orifice chips to the front of the glass tube. Since the orifice chips can be made of silicon using typical integrated circuit techniques, they are of high precision and are inexpensive. The simplicity of the device facilitates high volume low cost production of ink jet head structures.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. An ink jet head structure comprising:

a cylindrical glass rod having a bore extending along the longitudinal axis of the rod;

a groove formed transversely across said rod having a surface substantially parallel to the longitudinal axis of the rod and spaced a predetermined distance from said axis which is less than the radius of the rod and greater than the radius of the bore of the rod; and a piezoelectric crystal driver located on said groove surface for periodically constricting and expanding the bore of the rod in order to cause an ink stream to break up into droplets, wherein said driver surrounds less than approximately one half of the circumference of said bore.

2. The structure of claim 1 wherein said groove surface and driver are substantially flat.

3. An ink jet head structure comprising:

a cylindrical glass rod having a coaxial bore, said rod having a flat front surface;

a nozzle plate anodically bonded to the front surface of the rod, said plate including an orifice which is substantially concentric with said bore;

a metal screen anodically bonded to an input end of said rod; and a feeder tube anodically bonded to the metal screen in fluid communication with the bore, wherein said metal screen filters fluid passing from the tube to the bore.

4. The ink jet head structure of claims 1 or 2 wherein said rod has a flat front surface and further including a nozzle plate anodically bonded to said front surface, said plate including an orifice which is substantially concentric with said bore in order to accurately control the size of said droplets.

5. The ink jet structure of claims 1 or 2 wherein:

said groove surface has a metal-organic paste located thereon; and said piezoelectric crystal is soldered to said paste, thereby bonding the driver to the groove surface.

6. The ink jet structure of claim 5 wherein said metal-organic paste is a silver paste.

7. The ink jet structure of claims 3 or 2 wherein said nozzle plate is silicon.

8. The ink jet structure of claims 1 or 3 further including a charging electrode aligned with and attached to said rod by means of an insulating support bracket.

9. The ink jet structure of claims 1 further including a metal layer anodically bonded to an input end of said rod and a feeder tube anodically bonded to said metal layer concentric with said rod, said metal layer including at least one opening for permitting the passage of fluid from said tube to the bore in said rod.

10. The ink jet structure of claim 9 wherein said metal layer is a screen which filters fluid passing from said tube to said bore.

11. The ink jet structure of claims 1 or 3 further including means for coupling a fluid input to said bore, comprising:

a cylindrical sleeve surrounding the front and sides of the rod, said sleeve including a front aperture exposing said bore;

a fitting attached to said input line and concentrically coupled to the rear of said sleeve; and an insulating ring located inside said sleeve and compressed between the rod and the fitting by the concentric cooperation between the fitting and the rear of said sleeve, said insulating ring providing a closed path from said input line to the rear of said bore.

12. The ink jet structure of claims 1 or 3 wherein said glass rod has a length of about one quarter of an inch.

13. The structure of claim 2 wherein said groove is extended to at least one end of said rod.

14. The ink jet structure of claim 5 wherein said metal-organic paste is a silver paste.

15. The ink jet structure of claim 4 wherein:

said groove surface has a metal-organic paste located thereon; and said piezoelectric crystal is soldered to said paste, thereby bonding the driver to the groove surface.

16. The ink jet structure of claim 4 wherein said nozzle plate is silicon.

* * * * *